United States Patent [19]

Kessie

[11] Patent Number: 5,301,595
[45] Date of Patent: Apr. 12, 1994

[54] HIGH TEMPERATURE ROPE SEAL TYPE JOINT PACKING

[75] Inventor: Andrew S. Kessie, Fishers, Ind.

[73] Assignee: General Motors Corporation, Detroit, Mich.

[21] Appl. No.: 904,281

[22] Filed: Jun. 25, 1992

[51] Int. Cl.⁵ .................................................. D04C 1/02
[52] U.S. Cl. ............................................. 87/6; 87/9; 277/230
[58] Field of Search ................. 87/6, 7, 8, 9; 277/229, 277/230

[56] References Cited

U.S. PATENT DOCUMENTS

| | | | |
|---|---|---|---|
| 1,950,858 | 3/1934 | Metcalf | 117/53 |
| 2,291,568 | 7/1942 | Balch | 87/6 |
| 3,463,197 | 8/1969 | Slade | 138/125 |
| 3,686,855 | 8/1972 | Falcy et al. | 57/145 |
| 4,034,547 | 7/1977 | Loos | 57/146 |
| 4,219,995 | 9/1980 | Tajima et al. | 57/220 |
| 4,321,854 | 3/1982 | Foote et al. | 87/6 |
| 4,567,917 | 2/1986 | Millard | 138/126 |
| 4,576,081 | 3/1986 | Felthuis et al. | 87/6 |
| 4,705,722 | 11/1987 | Ueda et al. | 87/9 X |
| 4,870,887 | 10/1989 | Tresslar et al. | 87/9 |
| 4,878,343 | 11/1989 | Weidenhaupt et al. | 57/222 |
| 4,912,781 | 4/1990 | Robins et al. | 2/167 |
| 4,915,762 | 4/1990 | Berlincourt et al. | 87/9 X |
| 4,988,669 | 1/1991 | Dersch | 505/1 |
| 5,082,293 | 1/1992 | Steinetz et al. | 277/229 X |

FOREIGN PATENT DOCUMENTS 2241252  8/1991  United Kingdom ............ 87/9

OTHER PUBLICATIONS

3M-Ceramic Fiber Products For High Temperature Applications Brochure, Sep. 1984.

Primary Examiner—Joseph J. Hail, III
Attorney, Agent, or Firm—Saul Schwartz

[57] ABSTRACT

A high temperature rope seal type joint packing including a cylindrical core made of bundled and twisted ceramic fibers and a metallic cover around the core made of a plurality of cross woven and braided metallic strands each consisting of a plurality of round stainless steel wires arranged in side-by-side relationship.

2 Claims, 1 Drawing Sheet

HIGH TEMPERATURE ROPE SEAL TYPE JOINT PACKING

This invention was made in the course of work under a contract or subcontract with the United States Department of Defense.

FIELD OF THE INVENTION

This invention relates to rope seal type joint packings for high temperature environments such as in gas turbine engines.

BACKGROUND OF THE INVENTION

In gas turbine engines, rope seal type joint packings are used to minimize leakage of hot gas between stationary components of the engine, such as between a turbine vane stator and the outer case of the engine. Usually, the rope seal seats in a groove in one component and bears against a flat wall of the other component facing the groove. Environmentally, such rope seals operate under a typical pressure differential across the rope seal of on the order of up to 80 psi, at a typical temperature of up to about 1400 degrees F., and with small but recurring relative movement between the two stationary components resulting from relative thermal growth and the like.

Prior rope seals have included a core of bundled and twisted ceramic fibers surrounded by a cover of cross woven flat stainless steel strips, the core effecting an adequate high temperature seal and the cover protecting the core against abrasion due to relative movement between the stationary elements of the engine. Undesirable characteristics of the prior rope seal, however, include stiffness and lack of compressibility. A rope seal type joint packing according to this invention is a novel improvement over the aforesaid prior rope seal.

SUMMARY OF THE INVENTION

This invention is a new and improved rope seal type joint packing particularly suited for high temperature environments such as in gas turbine engines. The rope seal according to this invention includes a cylindrical core of bundled and twisted ceramic fibers for flexibility and sealing performance and an abrasion resisting metallic cover made of a plurality of cross woven metal strands, each stand including a plurality of side-by-side arranged stainless steel wires each having the same cross sectional diameter in the range of between about 0.100 mm and 0.800 mm depending on the specific size and requirements of the application. The round stainless steel wires of the rope seal according to this invention afford the seal improved flexibility and compressibility in comparison to the aforesaid prior rope seal type joint packing.

DESCRIPTION OF A PREFERRED EMBODIMENT

Figure 1:
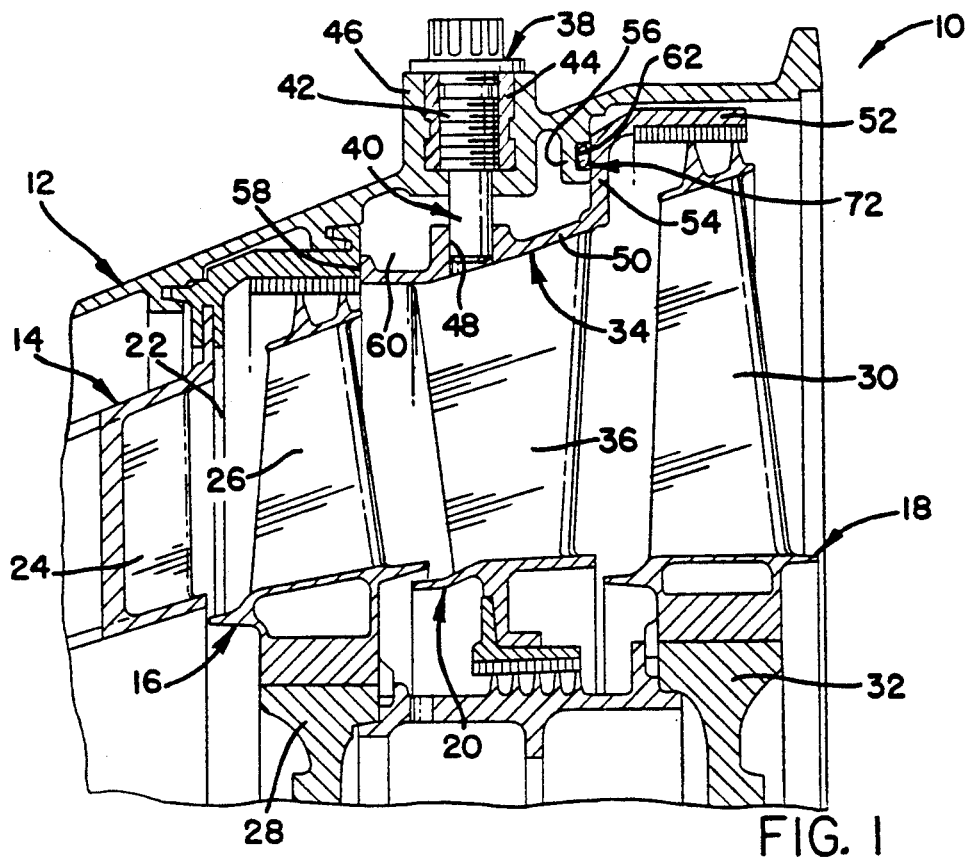
FIG. 1 is a fragmentary sectional view of a gas turbine engine, taken along the longitudinal centerline of the engine, having a rope seal type joint packing according to this invention.

Referring to FIG. 1, a gas turbine engine 10 includes an outer case 12 made of a high temperature alloy metal. The case 12 surrounds a turbine section of the engine including a stationary nozzle ring 14, a pair of turbine rotors 16,18 and an annular stator 20. The nozzle ring 14 defines the upstream or forward end of an annular hot gas flow path 22 of the engine. Hot gas generated in a combustor, not shown, is ducted to the nozzle ring and expanded through and directed by a plurality of vanes 24 of the ring toward the turbine rotors 16,18 and the stator 20.

The turbine rotor 16 has a plurality of turbine blades 26 around the circumference of a wheel 28. The wheel 28 is supported for rotation about the engine centerline, not shown. This rotor 16 is defined as the first stage turbine rotor and is between the nozzle ring 14 and the annular stator 20. The turbine rotor 18 has a plurality of turbine blades 30 around the circumference of a wheel 32 supported for rotation about the aforesaid engine centerline and is defined as the second stage turbine rotor downstream of the stator 20.

The stator 20 includes a ring-shaped outer shroud 34 and a plurality of integral stator vanes 36 defining an annular stator vane stage between the first and second turbine rotors. The outer shroud is mounted to the case 12 through a plurality of radial cross keypins, only a single cross keypin 38 being shown in FIG. 1. The cross keypin 38 includes a radially oriented cylindrical shaft 40 having a threaded end 42 received in an insert 44 in a boss 46 on the engine case 12. The cylindrical end 40 of the pin 38 is slidably received in a radial bore 48 of the outer stator shroud 34. The cross keypins afford the outer stator shroud a degree of radial freedom relative to the engine case 12 to accommodate relative thermal growth between the stator shroud and the case.

The outer stator shroud 34 has a cylindrical seal support ring 52 over the second turbine rotor which is integral with the central cylindrical wall 50 and connected to the latter by a radial, annular wall 54 in a plane perpendicular to the axis of rotation of the turbine rotors. The annular wall 54 bears against an internal annular flange 56 of the engine case 12 also in a plane perpendicular to the axis of rotation of the turbine rotors.

Hot gas from the gas flow path 22 can leak around the front edge 58 of the central cylindrical wall 50 of the outer shroud into an annular space 60 between the outer shroud and the engine case 12. An annular groove 62 in the flange 56 opens toward the annular wall 54 on the outer shroud and receives a rope seal type joint packing for minimizing leakage of hot gas from the annular space 60 between the flange 56 and the annular wall 54. When the engine is operating, a normal pressure gradient across the groove 62 is on the order of about 30 psi and a normal temperature around the groove is on the order of about 1100 degrees F.

Figure 2:
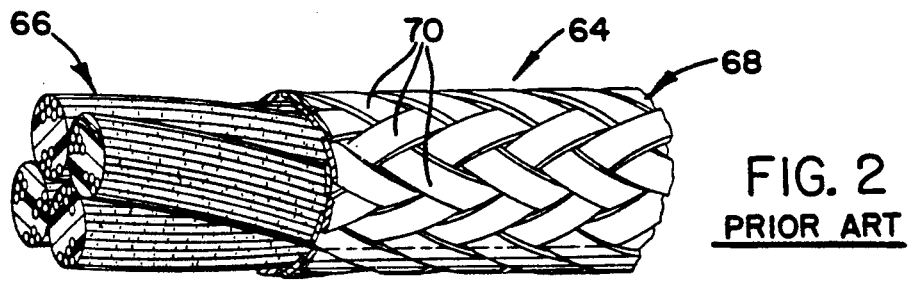
FIG. 2 is a fragmentary perspective view of a prior art rope seal type joint packing.

Referring to FIG. 2, a prior art rope seal type joint packing 64 is adapted for disposition in the groove 62 and includes a cylindrical core 66 made of bundled and twisted ceramic fibers and a metallic cover 68 consisting of a plurality of cross woven flat stainless steel strips 70. The cover 68 protects the core 66 against abrasion due to relative thermal growth between the engine case 12 and the outer shroud 34.

The prior art rope seal 64 is cut in lengths corresponding to the length of the groove 62 and installed into the groove. The cross woven flat stainless steel strips 70 afford the rope seal 64 a minimum degree of flexibility and compressibility which allows the seal to be installed only with substantial difficulty or special assembly compression tools. A rope seal type joint packing 72, FIG. 3, according to this invention has been found to exceed the prior art rope seal in flexibility and compressibility and, therefore, exceeds the prior art rope seal in ease of installation in the groove 62.

Figure 3:
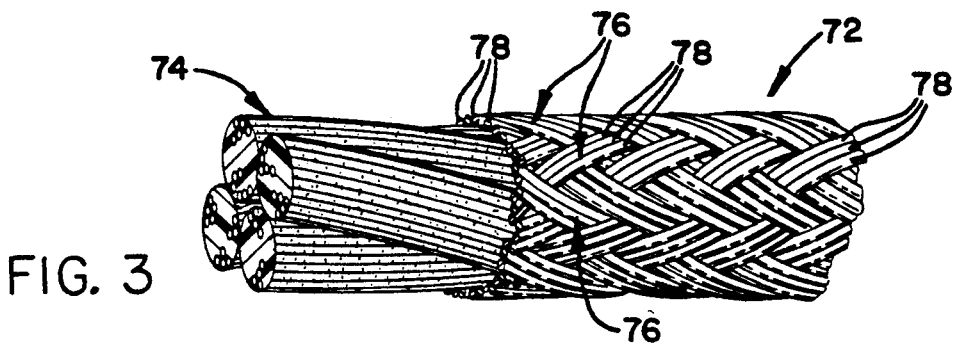
FIG. 3 is a fragmentary perspective view of a rope seal type joint packing according to this invention.

Referring to FIG. 3, the rope seal type joint packing 72 according to this invention includes a cylindrical core 74 made of bundled and twisted ceramic fibers and a metallic cover made of a plurality of cross woven strands 76 each including a plurality of side-by-side arranged, round stainless steel wires 78. The cross sectional diameters of the wires 78 are the same and are within a range of about 0.100 mm and 0.800 mm. The three abreast, side-by-side arrangement of the round wires in each cross woven strand affords the rope seal 72 sealing characteristics at least comparable to the prior art rope seal 64 but with additional flexibility and compressibility for easier installation in the groove 62. The beneficial effect of using round wires may be achieved with fewer or more wires in side-by-side arrangement in each strand and with cross weave patterns other than the pattern shown in the drawings, with larger or smaller diameter wires and of different material for higher or lower temperatures.

An experimental embodiment has successfully completed preliminary testing, with a rope seal 72 having an outside diameter of about 2 mm including a core 74 of bundled and twisted, in ¾ ply, NEXTEL 312 ceramic fibers and a cover made of 72, 0.114–0.140 mm diameter wires 78 of soft drawn 304 stainless steel woven in a 24-3 construction. (NEXTEL is a product of 3M Ceramics Materials Department, 3M Center, St. Paul, Minn., 55144.) Alternate core materials can be utilized with identical sealing and installation characteristics.

The embodiments of the invention in which an exclusive property or privilege is claimed are defined as follows:

1. In a high temperature rope seal joint packing including
   a cylindrical core made of a plurality of bundled and twisted ceramic fibers, and
   a metallic cover around said cylindrical core consisting of a plurality of cross woven metallic strands, the improvement comprising:
   each of said cross woven metallic strands consisting of at least one bare round stainless steel wire having a cross sectional diameter in a range of between 0.100 mm and 0.800 mm.

2. The high temperature rope seal joint packing recited in claim 1 wherein
   each of said woven metallic strands includes a plurality of said bare round stainless steel wires each having a diameter in said range of between 0.100 mm and 0.800 mm and arranged in side-by-side relationship so that said metallic strands are flat.

* * * * *